United States Patent

Hinkel

[11] Patent Number: 6,123,178
[45] Date of Patent: Sep. 26, 2000

[54] TORQUE CONVERTER

[75] Inventor: Rüdiger Hinkel, Röthlein/Heidenfeld, Germany

[73] Assignee: Mannesmann Sachs AG, Schweinfurt, Germany

[21] Appl. No.: 09/203,074

[22] Filed: Dec. 1, 1998

[30] Foreign Application Priority Data

Dec. 2, 1997 [DE] Germany .......................... 197 53 439

[51] Int. Cl.[7] .................................................. F16H 45/02
[52] U.S. Cl. ...................... 192/3.29; 192/107 R; 192/212
[58] Field of Search ................................. 192/3.28, 3.29, 192/3.3, 3.31, 66.1, 107 R, 212

[56] References Cited

U.S. PATENT DOCUMENTS

| 2,005,444 | 6/1935 | Weiss | 192/3.31 X |
| 2,055,300 | 9/1936 | Mauer | 192/3.29 X |
| 4,469,206 | 9/1984 | Motomura et al. | 192/3.28 |
| 5,167,312 | 12/1992 | Thirion de Briel et al. | 192/107 |

FOREIGN PATENT DOCUMENTS

| 34 10 526 A1 | 10/1985 | Germany . |
| 44 07 727 | 9/1995 | Germany . |
| 40 11 973 C2 | 1/1996 | Germany . |
| 195 36 952 | 4/1997 | Germany . |
| 57-54767 | 4/1982 | Japan . |
| 61-262262 | 11/1986 | Japan . |
| 62-147165 | 7/1987 | Japan ............................. F16H 45/02 |
| 4-347046 | 12/1992 | Japan . |
| 9-203453 | 8/1997 | Japan ............................. F16H 45/02 |

*Primary Examiner*—Richard M. Lorence
*Attorney, Agent, or Firm*—Cohen, Pontani, Lieberman & Pavane

[57] ABSTRACT

A torque converter according to the present invention includes a converter housing, a turbine wheel arranged in the converter housing so as to be rotatable relative thereto around a converter rotational axis (A), and a bridge coupling for the substantially rotation-proof selective connection of the turbine wheel to the converter housing. The bridge coupling has a coupling mechanism connected in substantially rotation-proof fashion to the turbine wheel and includes a friction surface which may be selectively brought to rest on a counter friction surface on the converter housing or selectively connected in rotation-proof fashion thereto. The friction surface is provided on a friction surface carrier connected in rotation-proof fashion to a coupling component that is rotatable with the turbine wheel. The coupling component is pivotable relative to the friction surface carrier around a circumferential line or a circumferential line region naming around the converter rotational axis (A).

22 Claims, 2 Drawing Sheets

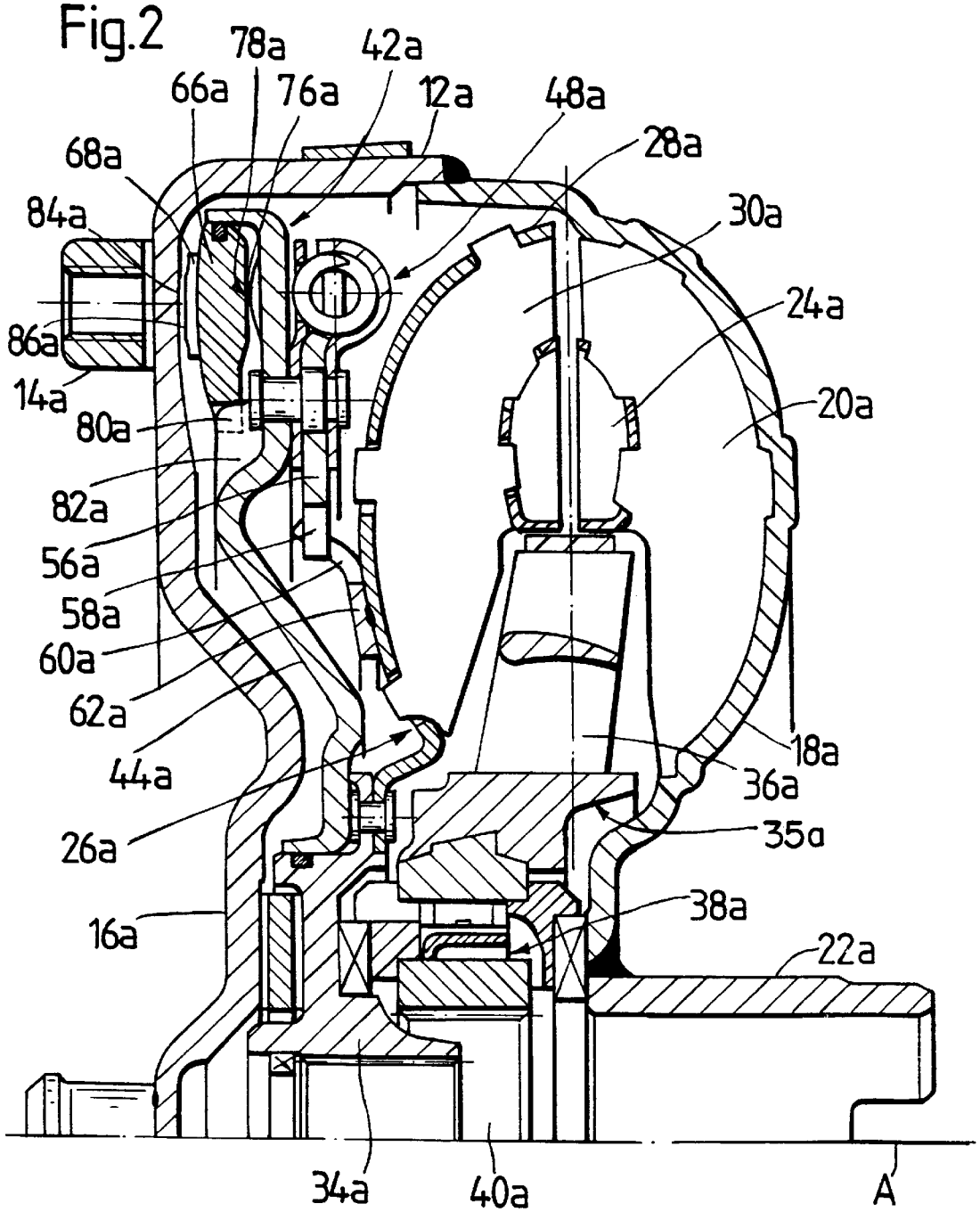

TORQUE CONVERTER

BACKGROUND OF THE INVENTION

1. Field of the Invention

The present invention relates to a torque converter including a converter housing, a turbine wheel rotatably arranged for rotation about a converter axis of rotation relative to the converter housing, and a bridge coupling for the substantially rotation-proof selective coupling of the turbine wheel to the converter housing. The bridge coupling comprises a coupling mechanism connected in substantially rotation-proof fashion to the turbine wheel and having at least one friction surface which can be selectively brought to rest on a counter friction surface provided on the converter housing or selectively connected thereto in rotation-proof fashion.

2. Description of the Related Art

A prior art torque converter of this type is known, for example, from DE 34 10 526 A1. In this prior art torque converter, a coupling disk may be brought to rest with its substantially flat and substantially radially-extending friction surfaces on a counter friction surface of the converter housing for establishing the bridging state. In this known torque converter, the following problem exists. During operation, due to the high working fluid pressure prevailing in the interior of the converter housing and also due to centrifugal forces, the converter housing becomes distended, especially in the radially outer area. As a result, the counter friction surface provided on the converter housing is positioned at a slant relative to the friction surface in this condition. The consequence of this is that the essential contact between the friction surface and the counter friction surface is moved radially outward, and what is known as edge carrying or edge friction is produced. This produces disproportionate wear on the friction surface or the counter friction surface in the radially outer area and thus considerably impairs the useful life of the torque converter. The disproportionate wear causes an overload or "burning" of the coupling in the radially outer area where the friction occurs.

In the torque converter known from the prior art, the problem also exists that a coupling piston, which generally carries the friction surface in its radially outer area, is, like the converter housing, deformed by the pressure prevailing in the converter interior. Specifically, the deformation is such that the coupling piston is pressed in its radially inner area toward an axial end side of the converter housing. This causes the coupling piston being pivoted or deformed around a circumferential line region. When the coupling piston undergoes a pivoting movement, the friction surface connected thereto pivots as well, so that a slanted position of the friction surface relative to the counter friction surface is again created. The aforementioned deformation of the coupling piston causes an especially disproportional load occurs in the radially inner area of the friction surface or the counter friction surface.

SUMMARY OF THE INVENTION

The object of the present invention is therefore to provide a torque converter in which, even when deformation of individual components occurs during operation, it is possible to prevent uneven or disproportionate wear from occurring in the area of the bridge coupling.

According to the invention, this object is attained by a torque converter comprising a converter housing, a turbine wheel arranged in the converter housing so as to be rotatable relative thereto around a converter rotational axis, and a bridge coupling for the substantially rotation-proof optional coupling of the turbine wheel to the converter housing. The bridge coupling comprises a coupling mechanism connected in substantially rotation-proof fashion to the turbine wheel and having at least one friction surface, which can be brought to rest on a counter friction surface provided on the converter housing or connected in rotation-proof fashion thereto.

Furthermore, the friction surface of the torque converter according to the invention is mounted on a friction surface carrier which is connected in rotation-proof fashion to a coupling component rotatable with the turbine wheel. The coupling component may be pivoted relative to the friction surface carrier around a circumferential line or a circumferential line region running around the converter rotational axis.

Thus, a pivotal decoupling occurs between the friction surface carrier and the coupling component so that when the coupling component is deformed due to the working fluid pressure prevailing in the converter interior, the preferably annular friction surface carrier is not forced to follow this deformation movement.

To attain the stated object, it is proposed according to another aspect of the present invention that the counter friction surface be curved, and that the friction surface be curved in complementary fashion for the purpose of attaining substantially complete contact with the counter friction surface.

The curve in the counter friction surface and friction surface counteracts the distention of the converter housing that would otherwise occur during operation. That is, because a curve is already provided, the bulging that nonetheless occurs will impair the curve less than it would a flat area or, given suitable selection of the curve radius, the curved surface will remain virtually unchanged. The distention of the converter housing during operation will not result in a disproportionate load on the friction surface or the counter friction surface in any radial areas thereof. Thus, the operating life of a torque converter with a bridge coupling constructed in this manner can be clearly lengthened, compared with conventional torque converters.

In an advantageous embodiment, the friction surface and the counter friction surface lie approximately parallel to a plane that is orthogonal to the converter rotational axis, and for the counter friction surface and the friction surface to be curved relative to this plane in the axial direction. The effect on the contour of the counter friction surface and the friction surface is further minimized when the counter friction surface is curved concavely and the friction surface is curved convexly.

To minimize the number of parts, it is proposed that the counter friction surface be embodied on an inner surface of an axial end wall of the converter housing.

To provide the greatest possible effective range, it is proposed that the friction surface and/or the counter friction surface surround the converter rotational axis in a substantially annular manner.

In the torque converter according to the invention, it is possible for the coupling component to rest with a curved area on a preferably substantially flat surface of the annular friction surface carrier, whereby the circumferential line or the circumferential line region is formed in the contact area of the curved area with the flat surface of the annular friction surface carrier.

The flat surface of the annular friction surface carrier can thereby be substantially orthogonal relative to the converter rotational axis, and the curved area can extend axially toward the flat surface.

To obtain the greatest possible axial support for the annular friction surface carrier, it is proposed that the curved area surround the converter rotational axis in an approximately annular manner.

The coupling component may, for example, comprise a coupling piston or an element connected to a coupling position.

To provide a reliably acting torque coupling, it is proposed that the friction surface and/or the counter friction surface comprise a friction lining.

In the torque converter according to the invention, the coupling mechanism is preferably connected in rotation-proof fashion to the turbine wheel by a torsional vibration damper.

The present invention also relates to a bridge coupling for a torque converter, comprising a friction surface that selectively rests on a counter friction surface for establishing a connected state between a converter housing and a turbine wheel. The friction surface is provided on a friction surface carrier preferably embodied in a substantially annular fashion. The friction surface carrier is connectable in rotation-proof fashion to a coupling component rotatable with the turbine wheel, and the coupling component is pivotable relative to the friction surface carrier around a peripheral line or a circumferential line or a circumferential line region running around a converter rotational axis.

The present invention also relates to a bridge coupling for a torque converter comprising a friction surface that selectively rests on a counter friction surface for establishing a connected state between a converter housing and a turbine wheel. The counter friction surface is curved and the friction surface is curved in complementary fashion for attaining substantially complete contact with the counter friction surface.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 2 is a view another embodiment of the torque converter of FIG. 1.

DETAILED DESCRIPTION OF THE PRESENTLY PREFERRED EMBODIMENTS

Figure 1:
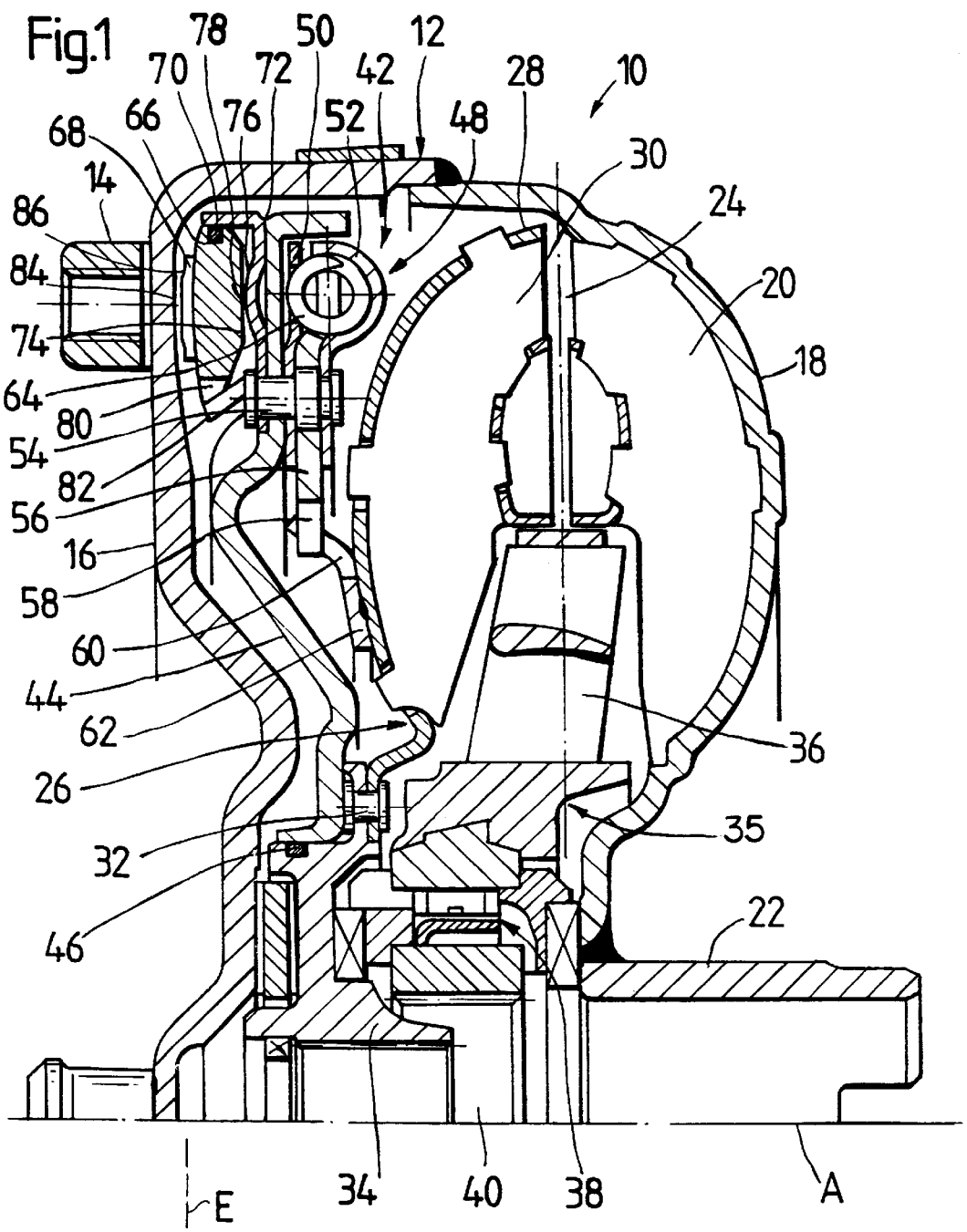
FIG. 1 is a partial longitudinal sectional view showing a torque converter according to an embodiment of the present invention.

FIG. 1 shows a partial longitudinal sectional view of a torque converter 10 according to an embodiment of the present invention. The torque converter 10 includes a converter housing 12 which is connectable to a drive shaft (not shown) such, for example, as a crankshaft of an internal combustion engine or the like, via a flex disk connectable by nuts 14 fixedly secured to the converter housing 12. The converter housing 12 comprises a cover 16 as well as a pump shell 18 securely connected thereto in a radially outer area, for example, by welding or the like. The pump shell 18 carries a plurality of pump blades arranged one after the other in the circumferential direction. The pump shell 18 is also securely connected to a pump hub 22.

A turbine wheel 26 is rotatably mounted in an interior 24 of the converter housing 12. The turbine wheel 26 has a turbine shell 28, which also carries a plurality of turbine blades 30. A radially inner side of the turbine wheel is connected in rotation-proof fashion to a turbine hub 34 by bolts 32. The turbine hub 34 is connectable in a known manner to a converter output shaft that is connectable to an automatic transmission or the like. Thus, the turbine wheel 26 comprises the turbine shell 28 with the blades 30 and the turbine hub 34, A guide wheel 35 with guide blades 36 that is attached via a free-wheeling mechanism 38 to a guide wheel hub 40 between the turbine wheel 26 and the pump shell 18.

The torque converter 10 also has a bridge coupling 42 having a coupling piston 44. An inner radial side of the coupling piston 44 is mounted on the turbine hub 34 so as to be rotatable relative thereto with intermediate arrangement of a sealing ring 46. The radially outer side of the coupling piston 44 is connected to a torsional vibration damper 48. Cover disks 50, 52, which constitute an input component of the torsional vibration damper 48 are securely connected to the coupling piston 44 such, by way of example, as using bolts 54. A hub disk 56 of the torsional vibration damper 48 is arranged axially between the cover disks 50, 52. The hub disk 56 has circumferential openings in the area of the bolts 54 that form a rotational distance limit for the torsional vibration damper 48 together with the bolts 54. The hub disk 56 is in intermeshed engagement via a toothing 58 located on the radial inside with a counter toothing 60 or projections on a part 62 securely connected to the turbine shell 28. Thus, a rotation-proof connection of the torsional vibration damper 48 is established with the turbine shell 28 via the hub disk 56 and with the coupling piston 44 via the cover disks 50, 52, on the other. In a known manner, a torsional damping spring arrangement with a plurality of springs 64 acts between the cover disks 50, 52 and the hub disk 56.

The bridge coupling 42 further comprises an annular friction surface carrier 66 which has a friction lining 68 mounted on one axial side. The radially outer side of the friction surface carrier 66 rests with an intermediate mounting of a sealing ring 70 on an element 72 which is securely connected to the coupling piston 44 via the bolts 54. A bulge 76 projects toward a substantially flat surface 74 of the friction surface carrier 70 from a radially extending area of the element 72. The bulge 76 rests on the surface 74 in a circumferential line region 78. The radially inner side of the friction surface carrier 66 is in intermeshed engagement via a toothing 80 with projections 82, which are curved away from the element 72, for example.

A counter friction surface 84 for the bridge coupling 42 is formed on a substantially radially extending wall section of the cover 16 of the converter housing, 12. A fiction surface 86 of the friction lining 68 engages or rests on the counter friction surface 84 upon engagement of the bridge coupling. The counter friction surface 84 has a concave curve, so that it forms a concavely curved counter friction surface area running around the rotational axis A. In a complementary fashion, the friction surface 86 and the friction lining 68 are convexly curved, so that upon engagement of the bridge coupling, the friction surface 86 rests substantially completely on the counter friction surface 84. The radius of curvature for the surfaces is preferably approximately 120 mm or greater.

Because a curve is created on the counter friction surface 84 or the friction surface 86, the reciprocal contact of these two surfaces is not substantially impaired during a distention of the converter housing 12 which may occur during operation of the torque converter 10 due to the working fluid pressure prevailing in the converter interior 24. That is, even in the event of deformation of the converter cover 16, substantially complete contact is attained between the friction surface 86 and the counter friction surface 84. This is also specifically assisted by the fact that the curved area of the counter friction surface is embodied in or near a transitional area between a radially-extending section of the converter cover 16 and a substantially axially-extending cylindrical section of the converter cover 16. Thus, the disproportionate stress which occurs in torque converters of the prior art on the friction surface 86 and/or the counter friction surface 84 in the radial inner or radial outer area due to deformation of the converter housing 12 is avoided.

FIG. 1 also shows that the friction surface carrier 66 is pivotally decoupled relative to the coupling piston 44. The coupling piston 44 is pressed by the working fluid pressure prevailing in the converter interior 24, particularly in its radially inner area, in which it is not supported in the axial direction, toward the cover 16 of the converter housing. This pressure causes a pivot movement or deformation of the coupling piston around a pivot line or deformation line running in the circumferential direction. Were the friction surface 86 rigidly connected to the coupling piston 44, the aforementioned pivot movement or deformation would result in the friction surface 86 pressing more strongly with a radially inner area against the counter friction surface 84 than with a radially outer area.

In contrast to the prior art, the coupling piston 44 in the torque converter 10 according to the invention pivots which leads to a rolling movement in the area of the bulge 76 which rests on the surface 74 of the friction surface carrier 66 in the circumferential line region 78. Because of the rolling movement, the friction surface carrier 66 and the friction surface 86 need not follow the pivot movement of the coupling piston. It can therefore be ensured that the friction surface 86 will always assume a desired position relative to the counter friction surface 84, unimpeded by the deformation state of the coupling piston 44 and the converter housing 12 or cover 16.

It should be pointed out that contact between the bulge and the surface of the friction surface carrier need not necessarily be produced completely along a line in the circumferential direction. It is also possible to provide a multi-point contact, e.g., a three-point contact, whereby the contact points then define the circumferential line region or the circumferential line around which pivoting occurs. Here, the term "circumferential line region" is to be understood as referring to multiple circumferential lines located adjacent to each other in the radial direction as well as to a line region limited in the circumferential direction of one or more circumferential lines. That is, the deformation need not occur (possibly uniformly) over the entire circumferential area.

It should be mentioned that the element 72 is preferably made of sheet metal. Thus, the projections 82, which establish a rotary connection between the friction surface carrier 66 and the coupling piston 44 may be formed integrally with the element 72 in a simple manner.

FIG. 2 shows a modification of the embodiment in FIG. 1, in which corresponding components are identified by the same reference numbers with an "a" added. The embodiment shown in FIG. 2 eliminates the element 72 in FIG. 1. The bulge 76a is formed directly on the coupling piston 44a, for example, by stamping or by the application of additional material. In addition, the projections 82, which in FIG. 1 are embodied integrally with the element 72 are now embodied as axial projections 82a mounted directly on the coupling piston 44a or securely connected thereto. Otherwise, the embodiment in FIG. 2 corresponds with respect to structure and function substantially to that described in reference to FIG. 1.

In the torque converter according to the invention, it is possible to prevent the deformation of any component of the torque converter occurring in operation due, for example, to the working fluid pressure prevailing in the converter interior, from causing an impairment of the contact between the friction surface and the counter friction surface of the bridge coupling. As a result, the operating life of the torque converter is significantly increased.

It should be pointed out that the torque converter may also be constructed in various other embodiments. For example, it is also possible, in the case of the bridge coupling, to provide a coupling disk with friction linings equipped with friction surfaces on both axial sides. In this case, to obtain the aforementioned advantages, at least one of the friction surfaces formed by the friction linings, as well as the counter friction surface interacting with this friction surface, is again curved.

Furthermore, of course, it is possible for the bridge coupling that optionally connects the converter housing to the turbine wheel to be attached to the turbine wheel in different areas. The depicted connection to the turbine shell via a torsional vibration damper is shown only as an example. Thus, the bridge coupling may be connected to the turbine hub directly or with the intermediate mounting of a torsional vibration damper, or may be connected to the turbine shell without the intermediate mounting of a torsional vibration damper.

Further, it is understood that a friction lining can be provided also or exclusively in the area of the counter friction surface, which then constitutes the counter friction surface. That is, the counter friction surface need not consist of a surface area of the converter housing itself, but rather can also be formed by or on a component securely connected to the converter housing.

To the extent that the above discussion relates to a rotation-proof connection of the turbine wheel, i.e., of any components thereof, to the converter housing, it is understood that a rotation-proof connection also encompasses a state in which a certain slip between the converter housing and the turbine wheel and/or a relative rotation by the torsional vibration damper is permitted.

The invention is not limited by the embodiments described above which are presented as examples only but can be modified in various ways within the scope of protection defined by the appended patent claims.

I claim:

1. A torque converter, comprising:
   a converter housing rotatably mounted about a converter axis of rotation and rotatably fixedly connected to a pump wheel;
   a turbine wheel rotatably mounted for rotating relative to said converter housing about said converter axis of rotation, wherein said converter housing has a counter friction surface facing said turbine wheel; and
   a bridge coupling having a coupling mechanism with a friction surface connected to said turbine wheel, said friction surface selectively axially movable with said bridge coupling for engaging said counter friction surface and thereby selectively connecting said turbine wheel to said converter housing, said friction surface being mounted on a friction surface carrier rotatably fixedly connected to said coupling mechanism so that said friction surface rotates with said coupling mechanism about said converter axis of rotation, said friction surface carrier pivotally connected to said coupling mechanism so that said friction surface carrier is pivotal about a pivoting axis that extends along a circumferential line about said converter axis of rotation and said friction surface and said counter friction surface each containing an area that is approximately parallel to a plane that is orthogonal to said converter axis of rotation.

2. The torque converter of claim 1, wherein said counter friction surface is curved and said friction surface is curved complementary to the curve of said counter friction surface for attaining substantially complete contact with said with said counter friction surface.

3. The torque converter of claim 2, wherein said friction surface and said counter friction surface are curved with respect to said plane in an axial direction.

4. The torque converter of claim 2, wherein said counter friction surface comprises a concave curve and said friction surface comprises a convex curve.

5. The torque converter of claim 2, wherein said counter friction surface comprises an inner surface of an axial end wall of said converter housing.

6. The torque converter of claim 2, wherein at least one of said counter friction surface and said friction surface surround said axis of rotation in an annular fashion.

7. The torque converter of claim 1, wherein one of said friction surface carrier and said coupling mechanism comprises a curved area and the other of said friction surface carrier and said coupling mechanism comprises a flat surface, said circumferential line formed by a contact area between said friction surface carrier and said coupling mechanism.

8. The torque converter of claim 7, wherein said flat surface of said other of said friction surface carrier and said coupling mechanism is substantially orthogonal to said axis of rotation.

9. The torque converter of clam 7, wherein said curved area defines an annular area around said axis of rotation.

10. The torque converter of clam 1, wherein said coupling mechanism comprises one of a coupling piston and an element connected to a coupling piston.

11. The torque converter of claim 1, wherein one of said friction surface and counter friction surface comprises a friction lining.

12. The torque converter of claim 1, further comprising a torsional vibration damper connected between said converter housing and said turbine wheel.

13. The torque converter of claim 1, wherein said friction surface carrier comprises an annular-shaped component.

14. A torque converter, comprising:
  a converter housing rotatably mounted about an axis of rotation and rotatably fixedly connected to a pump wheel;
  a turbine wheel rotatably mounted for rotating relative to said converter housing about said axis of rotation, wherein said converter housing has a counter friction surface facing said turbine wheel; and
  a bridge coupling having a coupling mechanism with a friction surface connected to said turbine wheel, said friction surface selectively axially movable with said bridge coupling for engaging said counter friction surface and thereby selectively connecting said turbine wheel to said converter housing, wherein said counter friction surface is curved and said friction surface is curved complementary to the curve of said counter friction surface for attaining substantially complete contact with said with said counter friction surface, wherein said friction surface and said counter friction surface each contain an area that is approximately parallel to a plane that is orthogonal to said axis of rotation and wherein said friction surface and said counter friction surface are curved with respect to said plane in an axial direction.

15. The torque converter of claim 14, wherein said counter friction surface comprises a concave curve and said friction surface comprises a convex curve.

16. The torque convener of claim 14, wherein said counter friction surface comprises an inner surface of an axial end wall of said converter housing.

17. The torque converter of claim 14, wherein at least one of said counter friction surface and said friction surface surround said axis of rotation in an annular fashion.

18. The torque converter of claim 14, wherein one of said friction surface and said counter friction surface comprises a friction lining.

19. The torque converter of claim 14, further comprising a torsional vibration damper connected between said torque converter and said turbine wheel.

20. The torque converter of claim 14, wherein said friction surface comprises an annular-shaped component.

21. A bridge coupling for a torque converter having a converter housing connected with a pump wheel and a turbine wheel rotatable relative to the pump wheel about an axis of rotation of said torque converter, said bridge coupling comprising:
  an annular friction surface carrier mountable about an axis of rotation of the torque converter;
  a friction surface mounted on said annular friction surface carrier;
  a counter friction surface mountable on the converter housing of the torque converter, said friction surface being axially movable for selectively engaging said counter friction surface; and
  a coupling component rotatably fixedly connectable to the turbine wheel and rotatably fixedly connected to said annular friction surface carrier, said friction surface carrier being pivotally connected relative to said coupling component for pivoting about a circumferential line about the axis of rotation with respect to rotation about the axis of rotation, wherein said friction surface and said counter friction surface each contain an area that is approximately parallel to a plane that is orthogonal to the axis of rotation and wherein said friction surface and said counter friction surface are curved with respect to said plane in an axial direction.

22. A bridge coupling for a torque converter having a converter housing connected with a pump wheel and a turbine wheel rotatable relative to the pump wheel about an axis of rotation of said torque converter, said bridge coupling comprising:

an annular friction surface carrier mountable about an axis of rotation of the torque converter;

a friction surface mounted on said annular friction surface carrier; and a counter friction surface mountable on the converter housing of the said torque converter so that said friction surface is axially movable for selectively engaging said counter friction surface, wherein said friction surface is curved and said counter friction surface is curved complementary to said friction surface so that a substantially entire portion of said friction surface contacts said counter friction surface, wherein said friction surface and said counter friction surface each contain an area that is approximately parallel to a plane that is orthogonal to the axis of rotation and wherein said friction surface and said counter friction surface are curved with respect to said plane in an axial direction.

* * * * *